Feb. 2, 1965   P. W. GREENE   3,167,795
METHOD OF MAKING BEADED SHOE WELTING
Filed Sept. 19, 1962   2 Sheets-Sheet 1
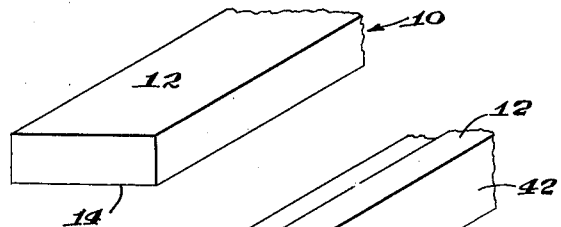
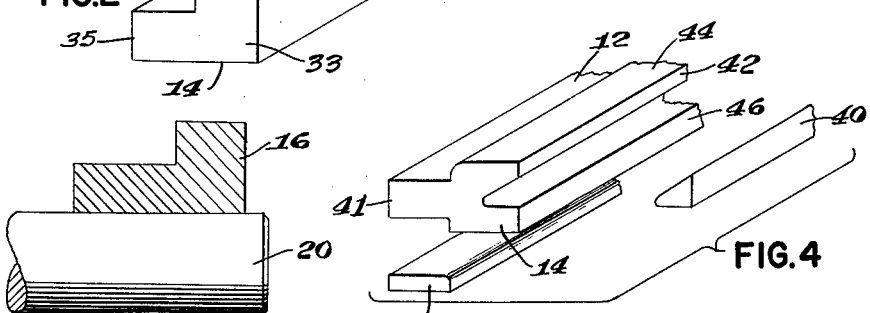
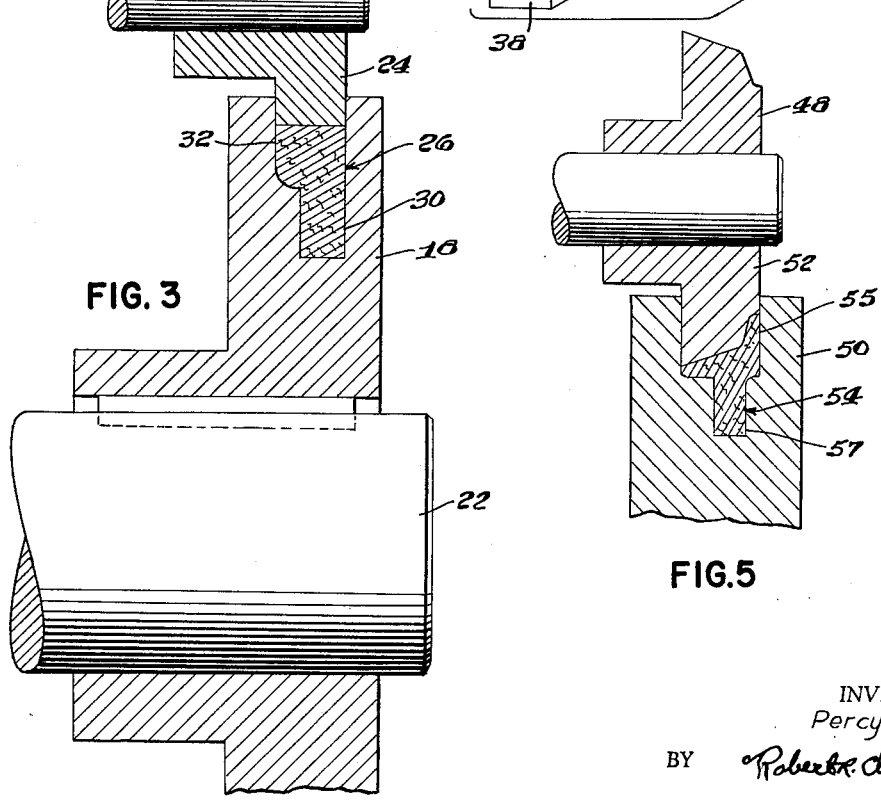
INVENTOR.
Percy W. Greene
BY Robert R. Churchill
ATTORNEY Feb. 2, 1965 P. W. GREENE 3,167,795
METHOD OF MAKING BEADED SHOE WELTING
Filed Sept. 19, 1962 2 Sheets-Sheet 2
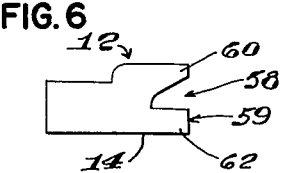
FIG. 6
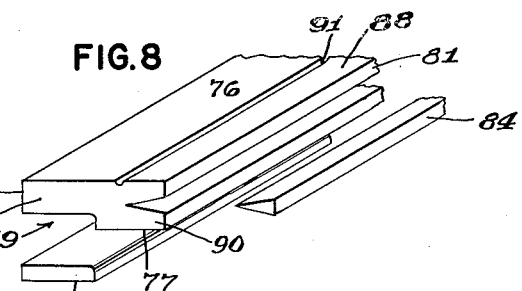
FIG. 8
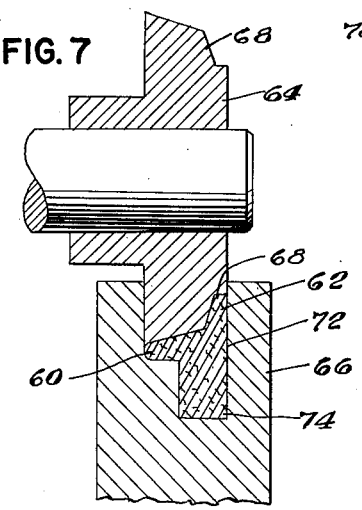
FIG. 7
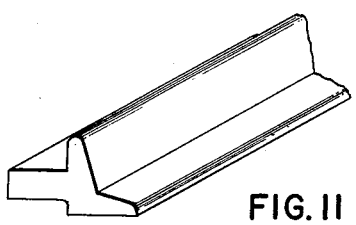
FIG. 11
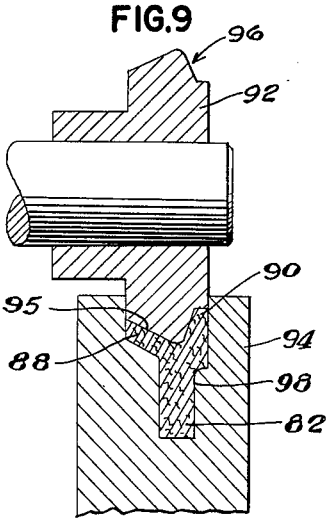
FIG. 9
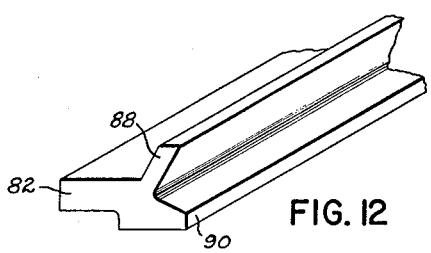
FIG. 10
FIG. 12
INVENTOR.
Percy W. Greene
BY Robert C. Churchill
ATTORNEY United States Patent Office 3,167,795
Patented Feb. 2, 1965

3,167,795
METHOD OF MAKING BEADED SHOE WELTING
Percy Wilton Greene, Whitman, Mass., assignor to Barbour Corporation, Brockton, Mass., a corporation of Massachusetts
Filed Sept. 19, 1962, Ser. No. 224,676
7 Claims. (Cl. 12—146)

This invention relates to a shoe welting and method of making the same.

The invention has for an object to provide a novel and improved shoe welting which embodies increased strength enabling the welt to adhere tightly to the upper of a shoe and which is attractive in appearance.

A further object of the invention is to provide a new and improved method of making shoe welting of any desired type in an economical and highly efficient manner and which results in welting of uniform shape and appearance.

With these general objects in view and such others as may hereinafter appear, the invention consists in the present shoe welting and method of making the same hereinafter to be described and particularly defined in the claims at the end of this specification.

In the drawings illustrating the preferred embodiment of the invention:

FIG. 1 is a perspective view of a solid leather fillet from which the present welt may be molded;

FIG. 2 is a perspective view of the same after an initial molding operation;

FIG. 3 is a cross sectional view of the molding rolls for providing the molded fillet shown in FIG. 2;

FIG. 4 is a perspective view showing the steps of removing portions of the initially molded fillet for producing one type of welt;

FIG. 5 is a cross sectional view of the molding rolls for producing a molded welt from the fillet shown in FIG. 4;

FIG. 6 is a perspective view of a modified form of a molded and cut fillet similar to FIG. 4;

FIG. 7 is a cross sectional view of the molding rolls for producing a modified form of welt from the fillet shown in FIG. 6;

FIG. 8 shows a modified fillet which has not been subjected to a premolding step, as shown in FIG. 3, and which shows the steps of removing portions of the fillet for producing a different type of welt;

FIG. 9 is a cross sectional view of molding rolls for producing a beaded welt from the cut fillet shown in FIG. 8;

FIG. 10 is a perspective view of a finished welt produced by the molding rolls shown in FIG. 7 in accordance with the present method;

FIG. 11 is a perspective view of a finished welt produced by the molding rolls shown in FIG. 5; and FIG. 12 is a perspective view of a finished welt produced by the molding rolls shown in FIG. 9.

In general the invention contemplates a novel and improved shoe welting embodying various styles and in the method of making the same in a novel and highly efficient manner whereby a strong, firm and attractive welt is produced and whereby various steps in welt manufacturing previously necessary are eliminated.

In particular the invention contemplates the production of leather shoe welting by making only the necessary cuts or incisions in the leather fillet and molding the precut fillet to the desired shape. The present method eliminates the conventional steps of folding and cementing the cut portions of the welt and results in a shoe welt having a stronger inseam edge and a welt of more uniform finished shape since the inseam edge does not have to be in two parts as does the inseam edge in leather welting produced according to conventional manufacturing methods.

The present invention provides a very versatile method of manufacturing leather shoe welting in that it enables various types of welting, such as, but not by way of limitation, dress welt, reverse welt, and/or welting of the type sold under the trademark "Stormwelt" to be produced from a fillet of welting material which has been cut in the same manner by molding the precut welting by passing it through rolls or dies shaped to produce the desired shape and style of finished welt. For example, the reverse welt cut in the manner illustrated in FIG. 8 can be molded as shown in FIG. 7 into a welt similar to that shown in FIG. 10 with the grain surface extending all the way across the top of the bead. Thus, it will be apparent that the present method provides for the production of uniform welting as well as substantial savings in labor and materials.

In order to prepare the precut welting strips for molding into their finished form, while not necessary, it is preferred to temper the strips before molding by running them through a lukewarm solution of sulfonated oil and water in the proportions of 1 to 4 parts, respectively. It has been found that tempering the welt material in this manner aids in causing the molded welt to retain its finished shape. Apparently, due to the characteristics of the leather, satisfactory molded welting may be produced without first tempering the welting strip.

Referring now to the drawings, 10 represents a leather fillet having a grain surface 12 and a flesh surface 14. FIGS. 1, 2 and 3 illustrate one form of the present invention wherein it is desired to increase the thickness of a portion of the fillet prior to making any cuts or incisions therein for producing the finished welting. FIG. 3 illustrates the method of increasing the thickness of a portion of the fillet, and in accordance with this form of the invention a pair of rolls 16, 18 are mounted on shafts 20, 22 as shown in FIG. 3. Roll 16 comprises a male die having an annular shoulder 24 arranged to cooperate with annular groove 26 in female roll or die 18. The groove 26 in female roll or die 18 includes a narrow portion 30 and a relatively wider portion 32. Each of the rolls 16, 18 are driven through conventional connections to a motor not shown.

In practice the rectangular leather fillet strip 10 is fed edgewise in between the bite of rolls 16, 18 and is compressed by the shoulder portion 24 of the roll 16 into the cavity or groove 26 in female roll 18 and into the shape shown in FIG. 2 which comprises a thicker portion 33 and a thinner portion 35. This provides in the finished welt a structure having increased strength adjacent the inseam edge through which the inseam stitching passes as the welt is sewn to the shoe upper, thereby causing the welt to tightly hug the shoe upper and remain in this position for substantially the life of the shoe. After the fillet 10 has been thickened, portions thereof are cut and removed from the fillet as illustrated in FIG. 4. The cutout portions illustrated in FIG. 4 are those made in order to produce a shoe welt referred to and sold under the Barbour Corporation trademark "Stormwelt." As shown, a relatively thin, wide strip 38 is removed from the bottom flesh surface 14 of the relatively thin portion of the welt strip which in the finished product is to be the welt extension 41. A relatively thin triangular portion 40 is removed from the marginal edge 42 of the thickened portion 33 of the welt strip substantially midway between the grain and flesh surfaces 12, 14, respectively, which provides in the finished welt a bead portion 44 and an inseam flange 46.

Upon the completion of the cutting operations the welt strip is fed edgewise between the bite of male and female rolls or dies 48, 50. Rolls 48, 50 are each mounted on shafts, only one of which is shown, which are driven through conventional connections to a motor. Male roll 48 includes an annular flange portion 52 shaped to form the bead portion, the flange inseam and the inseam face of the bead portion of the finished welt and is arranged to cooperate with the relatively wide portion 55 of the groove 54 in female roll 50. The groove 54 also includes a narrow portion 57 shaped to form the welt extension portion of the finished welt.

As the length of cut welt is feed between rolls 48, 50 it is compressed and shaped into its finished form as illustrated in FIG. 11.

In another form of the invention for producing another style of welt, as illustrated in FIGS. 6 and 7, a substantially rectangular fillet of welt material is thickened in accordance with the method described in connection with FIG. 3. A substantially triangular cut 58 is made in the thickened welt strip in the marginal edge 59, substantially midway between the grain and flesh surfaces 12, 14, to provide a portion 60 which is to be the bead portion in the finished welt and a portion which is to be the inseam edge 62 in the finished welt. The thickened and cut welt strip is then fed into the bite of male and female rolls or dies 64, 66 in the manner shown in FIG. 7. The male and female rolls 64, 66 are each mounted on a shaft and driven through suitable connections to a motor, not shown. The surface 68 of the male roll 64 is shaped to form the one-piece inseam flange 62 of the finished welt and the bead portion 60 of the finished welt in cooperation with the female roll 66. The female roll 66 is provided with a groove portion 72 shaped to form, during the molding operation, the welt extension 74 of the finished welt. The thickened and cut welt strip is compressed into its final finished shape during the molding operation illustrated in FIG. 7, and FIG. 10 illustrates the type of welt produced thereby.

FIGS. 8 and 9 illustrate still another form of the invention whereby a still different type of welt is produced by the cutting and molding operations illustrated herein. In accordance with this form of the invention a substantially rectangular fillet of welt forming material, of the type illustrated at 10 in FIG. 1 having a grain surface 76 and a flesh surface 77, is cut by removing a relatively wide, thin strip 78 from the flesh surface 77 of the strip to provide a cutout portion 79 extending from the marginal edge 80 to a point substantially midway between the marginal edges 80, 81 of the strip, thereby forming the welt extension portion 82 in the finished welt. A substantially triangular piece 84 is cut and removed from marginal edge 81 of the welt strip substantially midway between the grain and flesh surfaces 76, 77 thereof to provide a bead portion 88 and an inseam flange 90 in the finished welt. In order to lend a little flexibility to the bead portion 88 to enable it to more readily hug or be urged into the shoe upper when the welt is stitched to the shoe upper, a relatively thin longitudinal groove 91 is cut in the grain surface 76 of the welt strip adjacent the root of bead portion 88. After the welt strip is cut in the manner illustrated in FIG. 8 is it fed edgewise between male and female rolls or dies 92, 94 and shaped into its finished form. Rolls 92, 94 are each mounted on shafts and are driven through suitable connections to a motor, not shown. The surface 96 of roll 92 is shaped to form the inseam flange 90 of the finished welt and the inseam face 95 of the bead portion 88 of the finished welt in cooperation with female roll 94. Female die or roll 94 is provided with a groove 98 shaped to form the finished welt in cooperation with male roll 92 upon completion of the passage of the welt strip through the rolls. It will be understood that during the molding operations, herein described, the welt strip is progressively compressed between the rolls into its finished form and provides a uniform, firm and attractive finished welt as illustrated in FIG. 12.

While the rolls or dies have been illustrated and described as disposed such that the welt strip is molded edgewise or vertically during the molding operations, hereintofore described, it will be understood that the rolls or dies may be positioned horizontally and the welt strip fed therebetween in a horizontal position.

From the foregoing description it will be apparent that the present invention comprises an economical and versatile method of producing various types or styles of shoe welting and eliminates the conventional steps of cutting, folding and cementing the various portions of the welt strip heretofore necessary in order to produce shoe welting.

Having thus described the invention, what is claimed is:

1. The method of making a solid one-piece beaded welting free of overlapped and cemented portions which comprises the steps of cutting and removing from one marginal edge of an elongated rectangular fillet a wedge shaped strip to provide two spaced portions having a welt extension, and then molding the precut fillet to form and shape said spaced portions to provide an upstanding bead and an inseam flange extending from said welt extension.

2. The method of making a solid one-piece beaded welting free of overlapped and cemented portions which comprises the steps of cutting and removing a relatively wide thin strip from the underside of a rectangular leather fillet to form a welt extension, cutting and removing a wedge shaped strip from a marginal edge opposite the welt extension to provide two spaced portions, and then molding the precut fillet to form and shape said spaced portions to provide an upstanding bead and an inseam flange integral with and extending from said welt extension.

3. The method of making a beaded welting as defined in claim 2 wherein the molding operation shapes the bead to extend at an inwardly inclined angle relative to said welt extension.

4. The method of making a solid one-piece beaded welting free of overlapped and cemented portions which comprises the steps of molding and compressing a rectangular grain leather fillet of uniform thickness to provide an offset portion of increased thickness, the remaining portion forming a welt extension, cutting and removing a wedge shaped portion from the marginal edge of said thickened portion to provide two spaced portions, and then molding the precut fillet to form and shape said spaced portions to provide an upstanding bead and an inseam flange integral with and extending from said welt extension.

5. The method of making beaded welting as defined in claim 4 wherein the molding operation shapes the bead to extend the grain surface over the top of the bead.

6. The method of making a solid one-piece beaded welting free of overlapped and cemented portions which comprises the steps of molding and compressing an elongated rectangular grain leather fillet of uniform thickness to provide an offset portion of increased thickness, the remaining portion maintaining its initial thickness, cutting and removing a relatively wide, thin strip from the underside of said remaining portion to form a welt extension, cutting and removing a wedge shaped strip from the marginal edge of said thickened portion to provide two spaced portions, and then molding the precut fillet to form and shape said spaced portions to provide an upstanding bead and an inseam flange integral with and extending from said welt extension.

7. The method of making a beaded shoe welting as defined in claim 1 which includes the step of tempering the grain leather fillet prior to the molding operation.

References Cited in the file of this patent

UNITED STATES PATENTS

| | | |
|---|---|---|
| 1,828,728 | Arnold et al. | Oct. 27, 1931 |
| 1,908,486 | Peabody | May 9, 1933 |
| 2,142,198 | Lyon | Jan. 3, 1939 |
| 2,241,652 | Vizard | May 3, 1941 |
| 2,251,178 | Vizard | July 29, 1941 |
| 2,328,937 | White | Sept. 7, 1943 |
| 2,403,750 | Quimet | July 9, 1946 |
| 3,046,679 | Maertens et al. | July 31, 1962 |

OTHER REFERENCES

American Shoemaking Magazine, Apr. 21, 1948, page 36.